May 7, 1935. G. F. CAHILL 2,000,123
GAME AND GAME APPARATUS
Filed Nov. 23, 1932 11 Sheets-Sheet 3
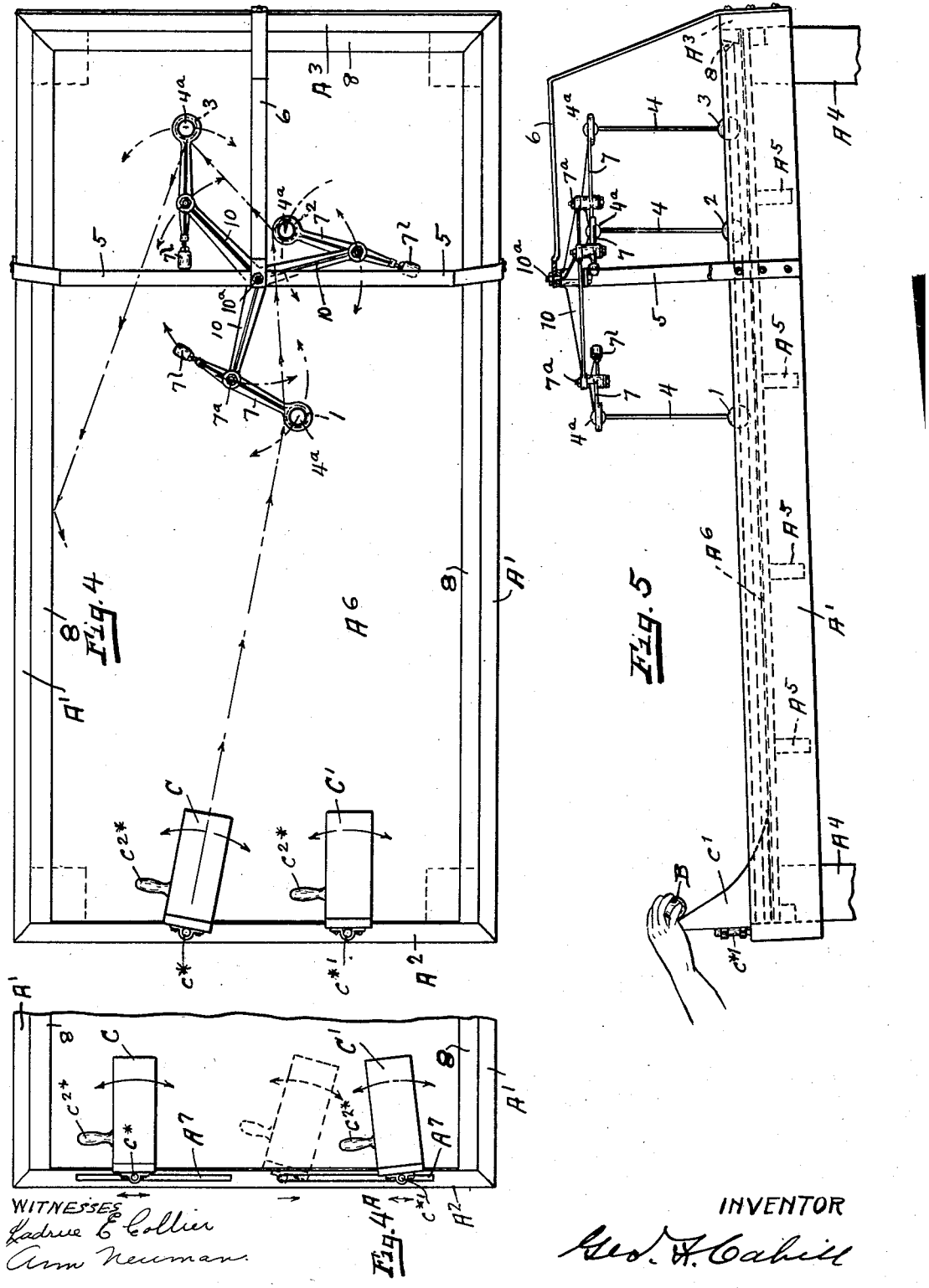
INVENTOR

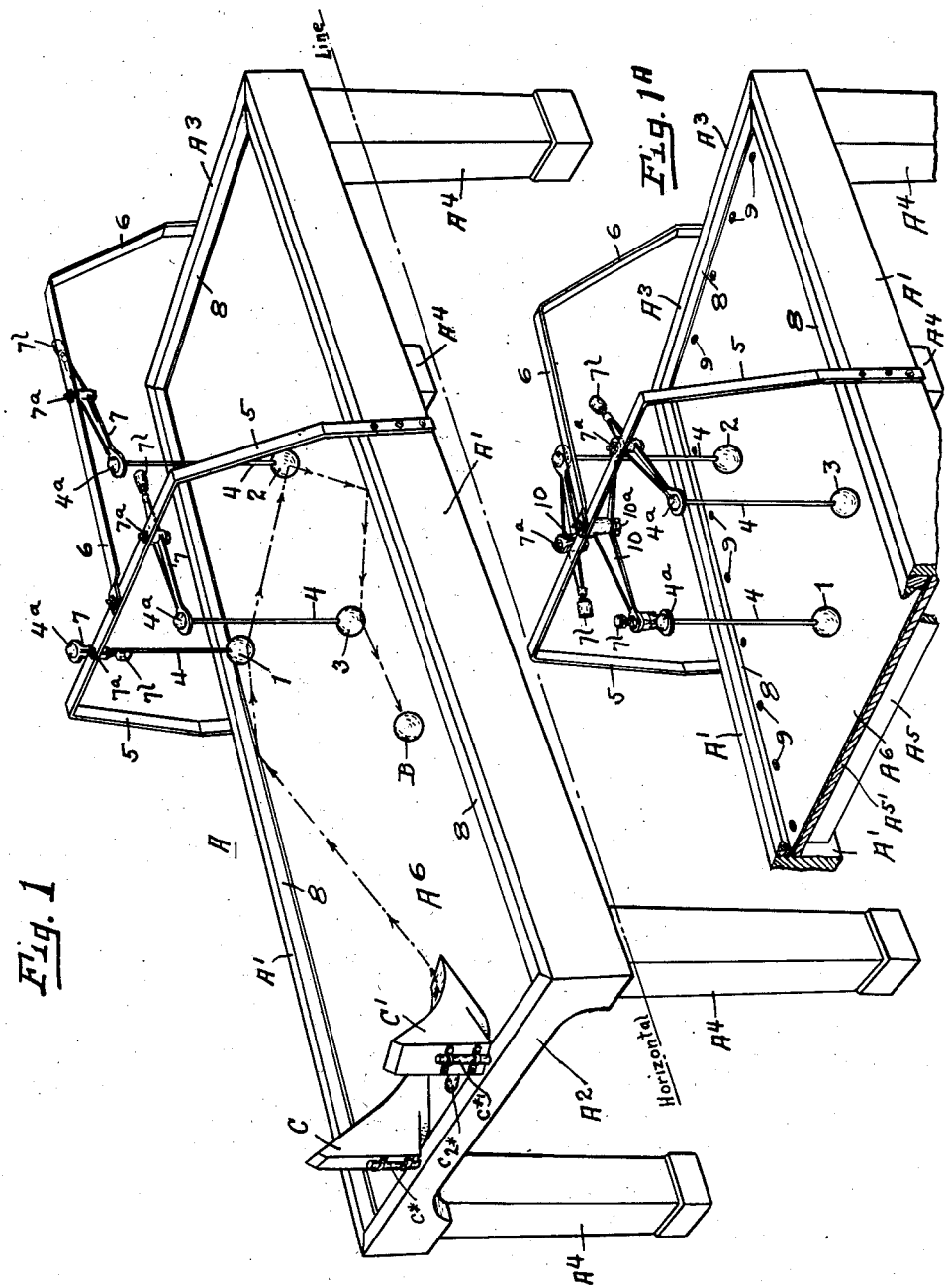

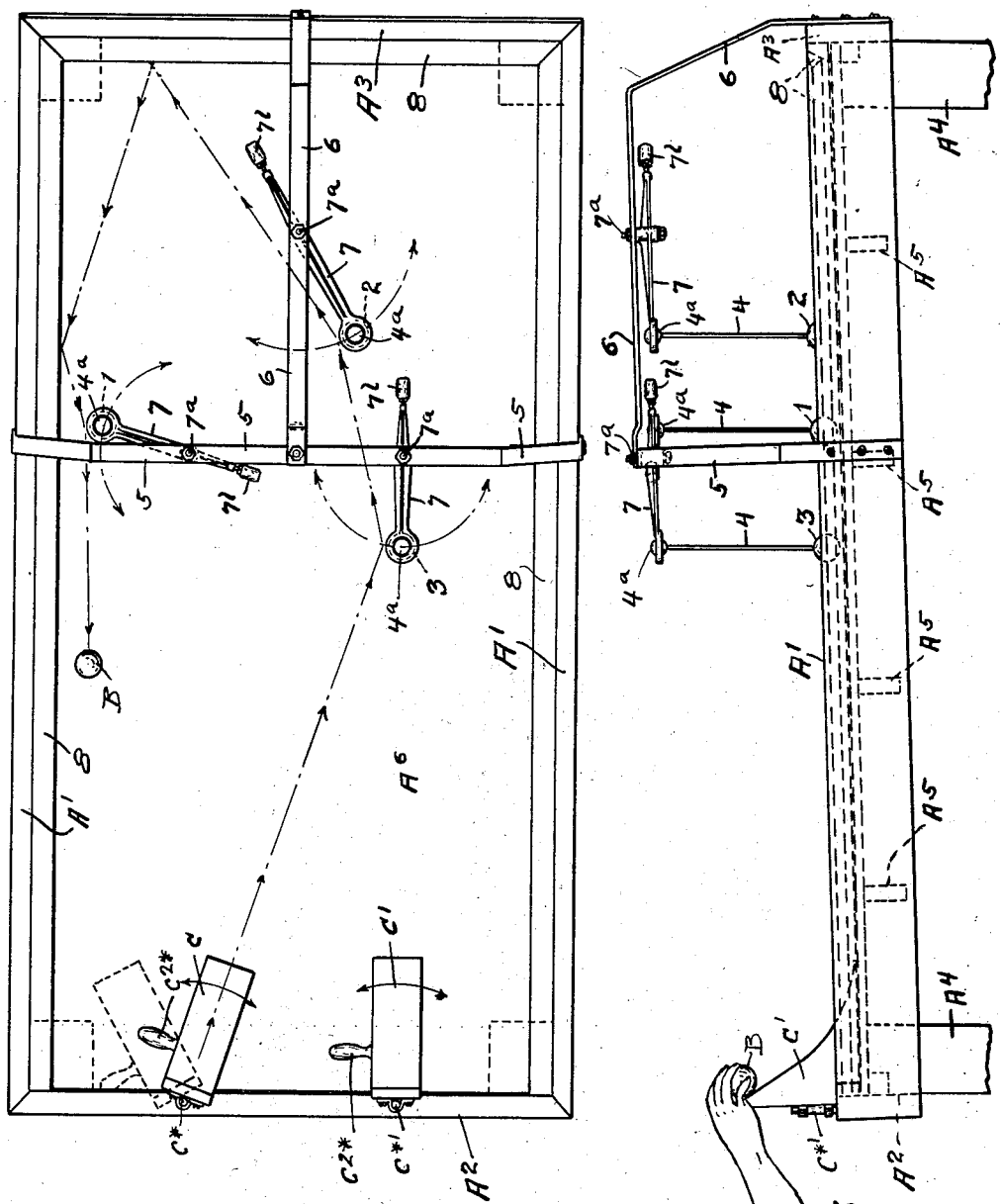

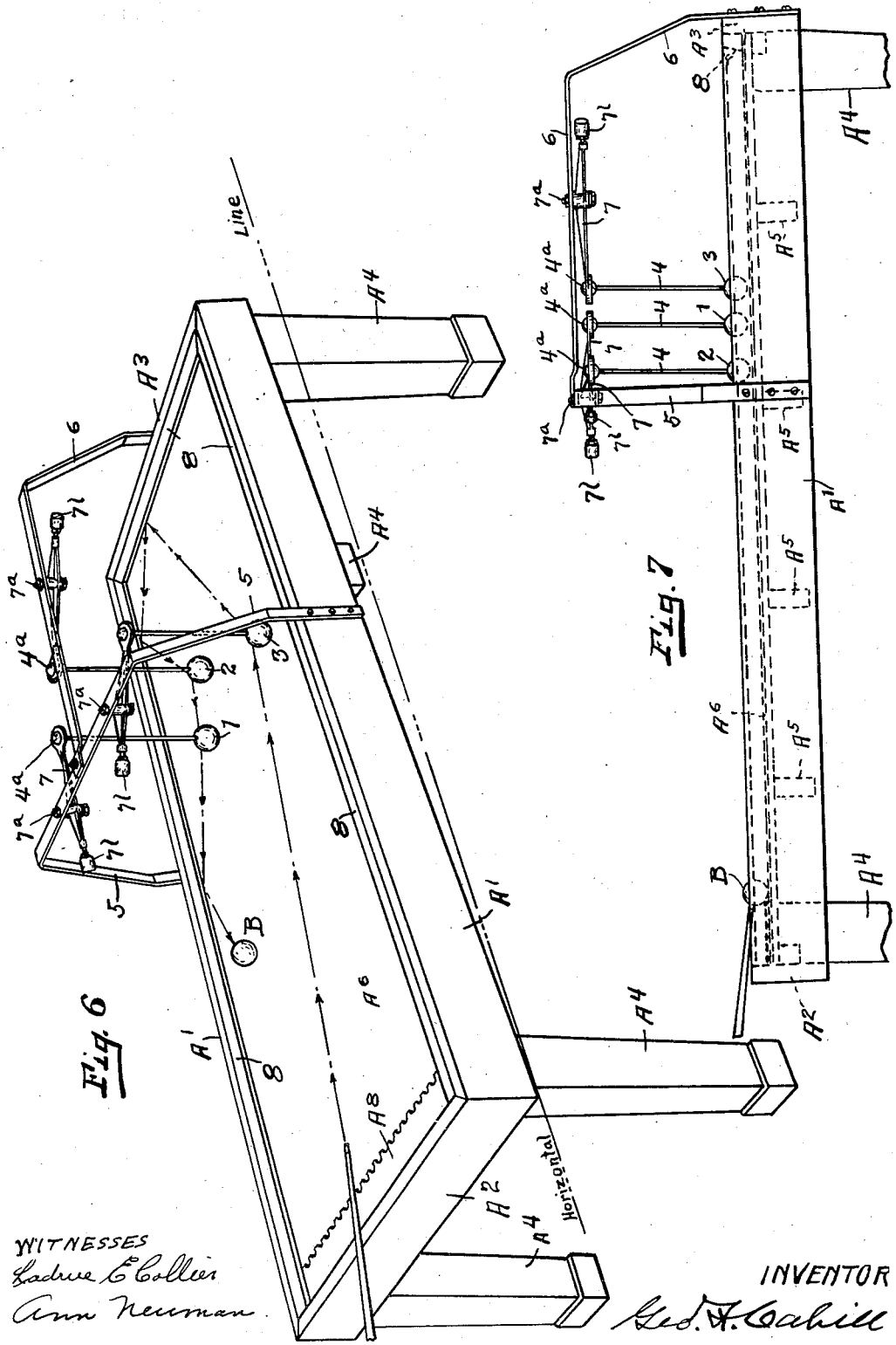

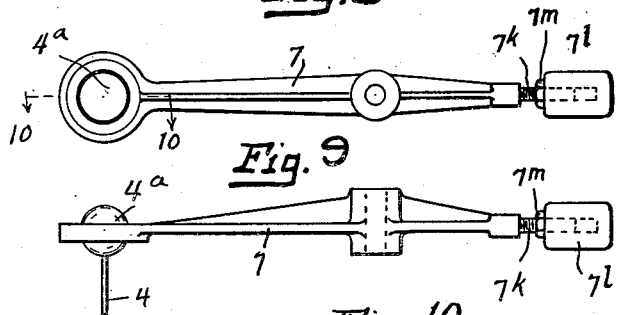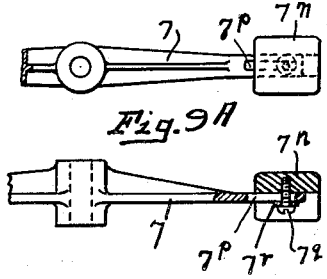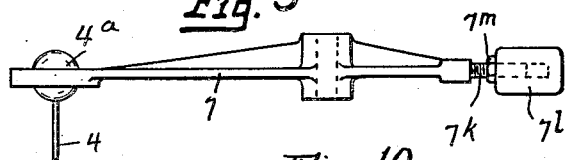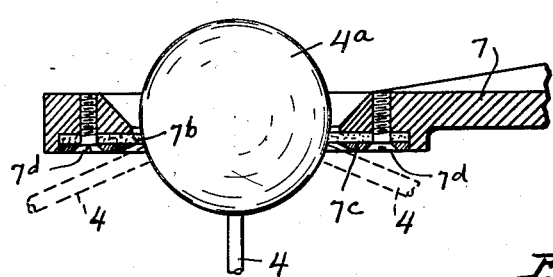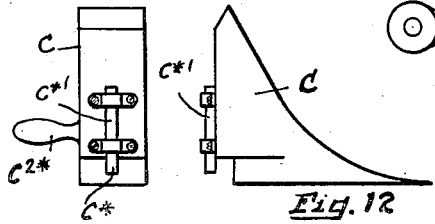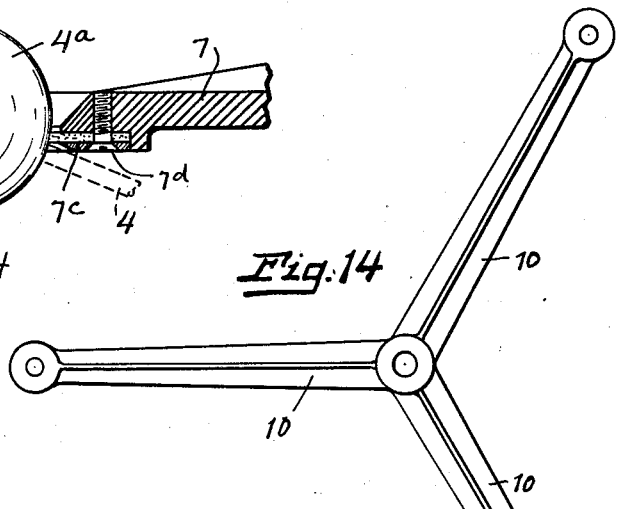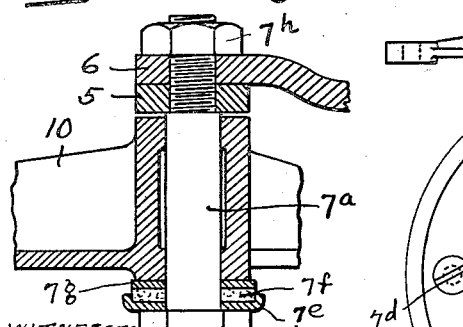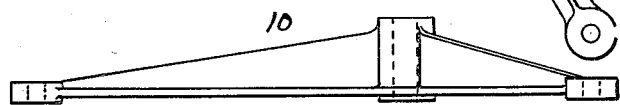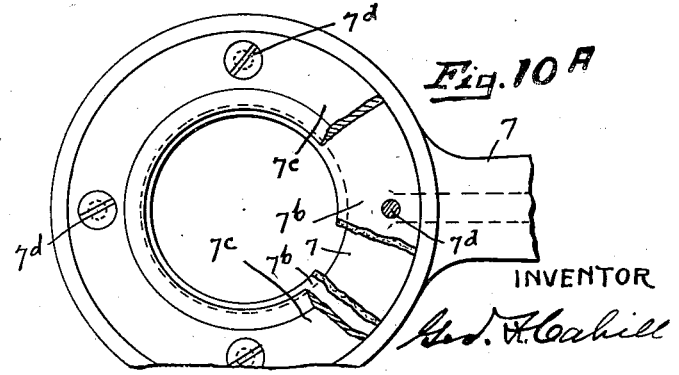

May 7, 1935.  G. F. CAHILL  2,000,123
GAME AND GAME APPARATUS
Filed Nov. 23, 1932   11 Sheets-Sheet 6
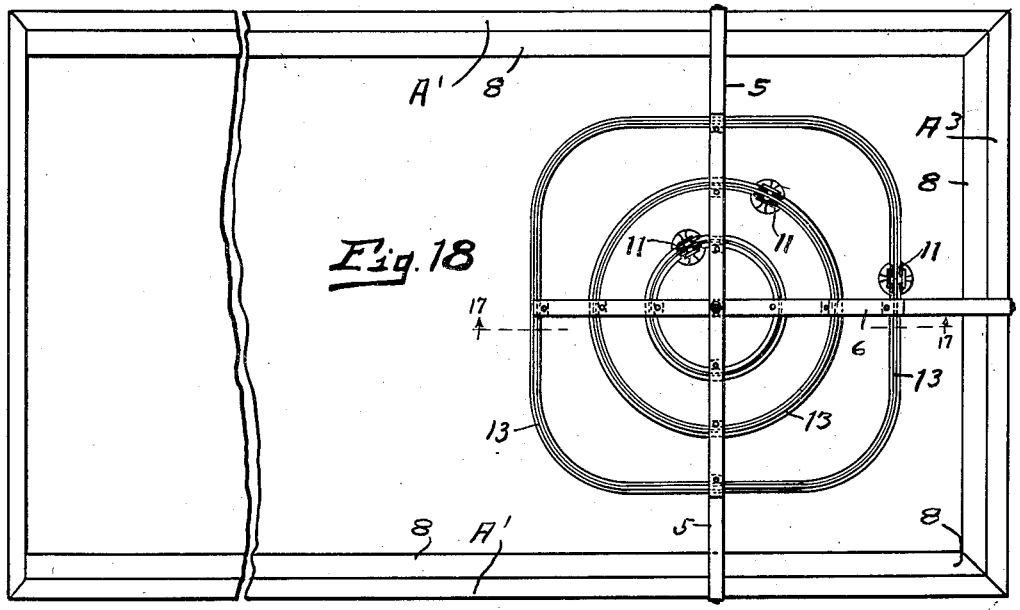
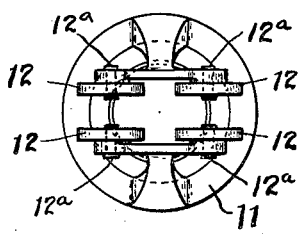
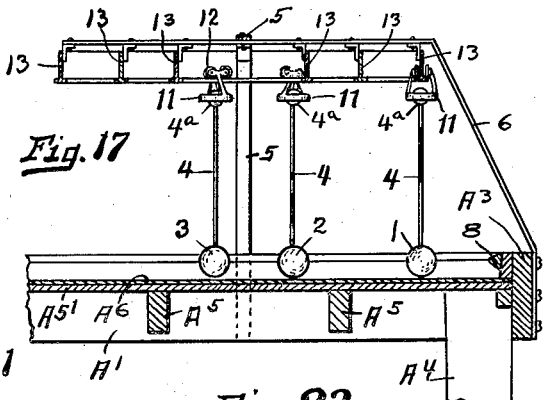
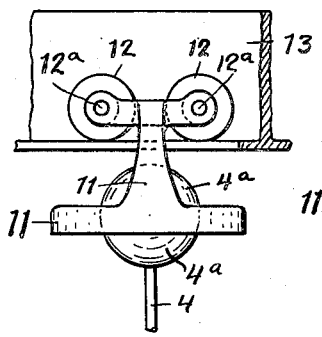
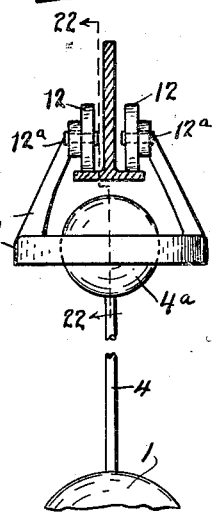
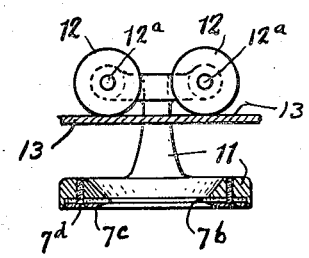
WITNESSES
INVENTOR

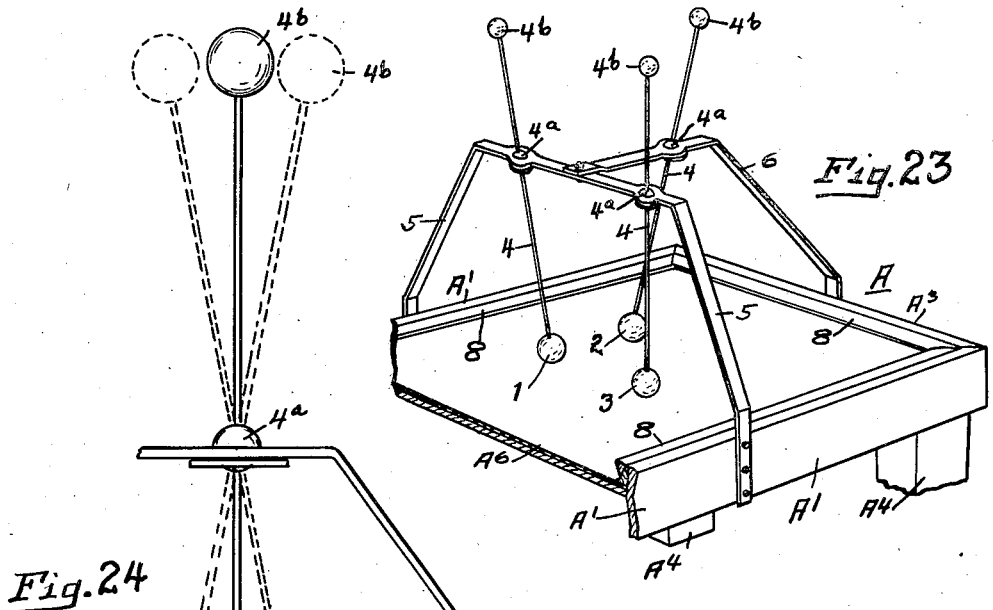

May 7, 1935.  G. F. CAHILL  2,000,123
GAME AND GAME APPARATUS
Filed Nov. 23, 1932   11 Sheets-Sheet 8

WITNESSES  
INVENTOR  
Geo. F. Cahill

May 7, 1935. G. F. CAHILL 2,000,123
GAME AND GAME APPARATUS
Filed Nov. 23, 1932. 11 Sheets-Sheet 9
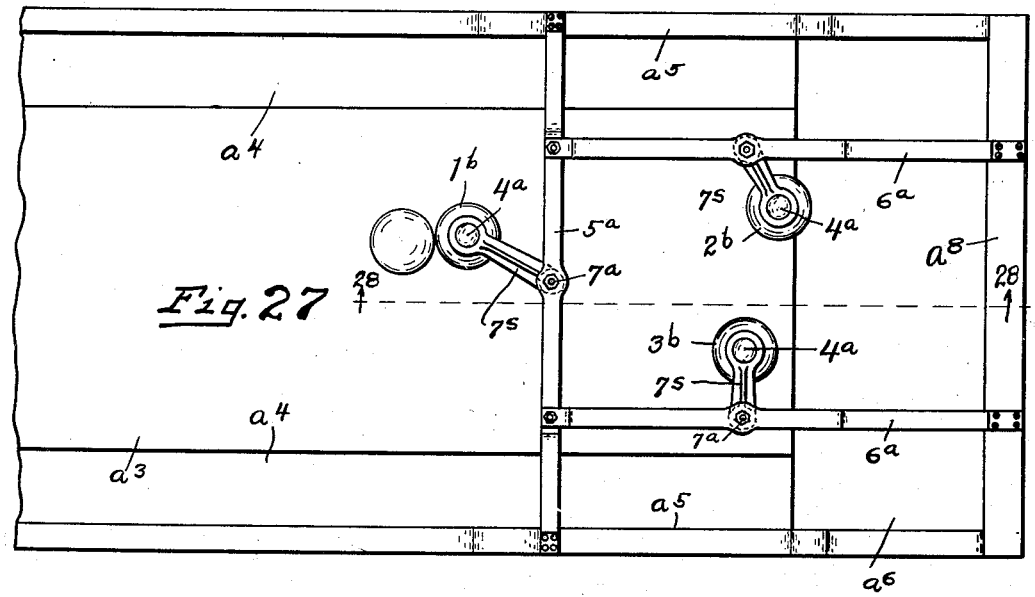
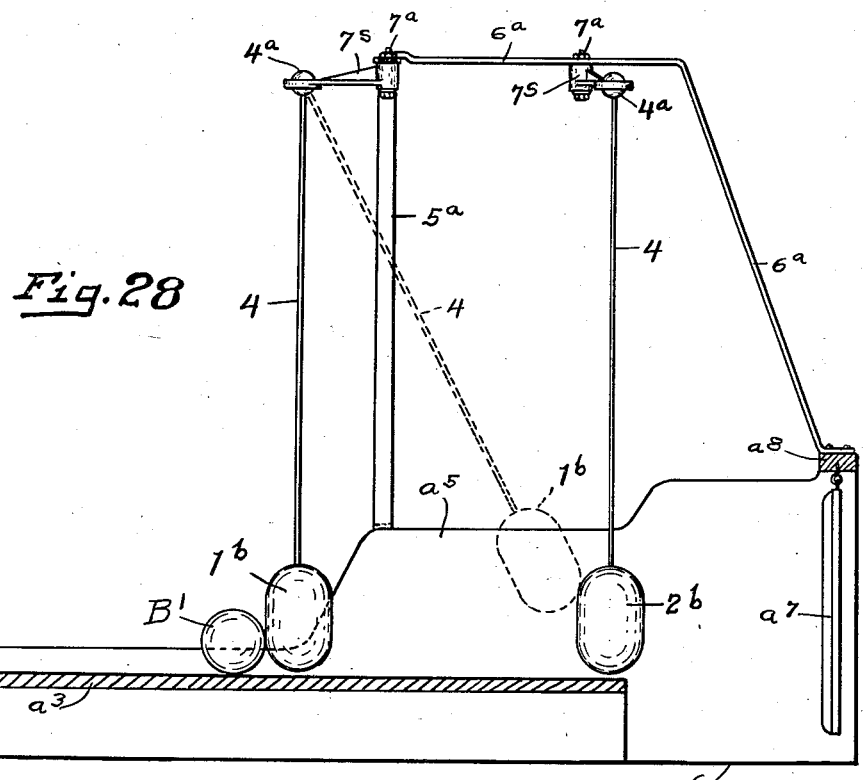
INVENTOR
Geo. F. Cahill

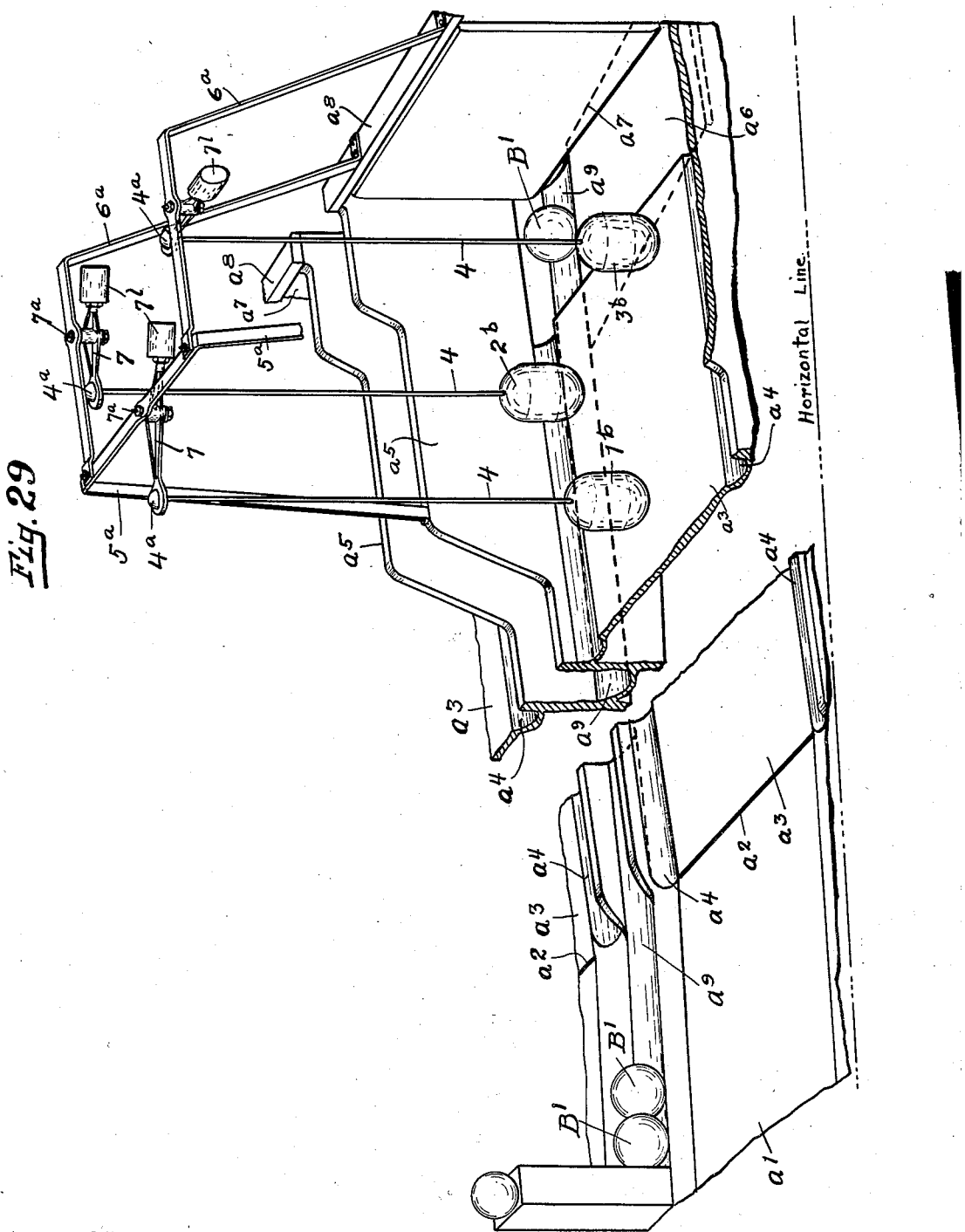

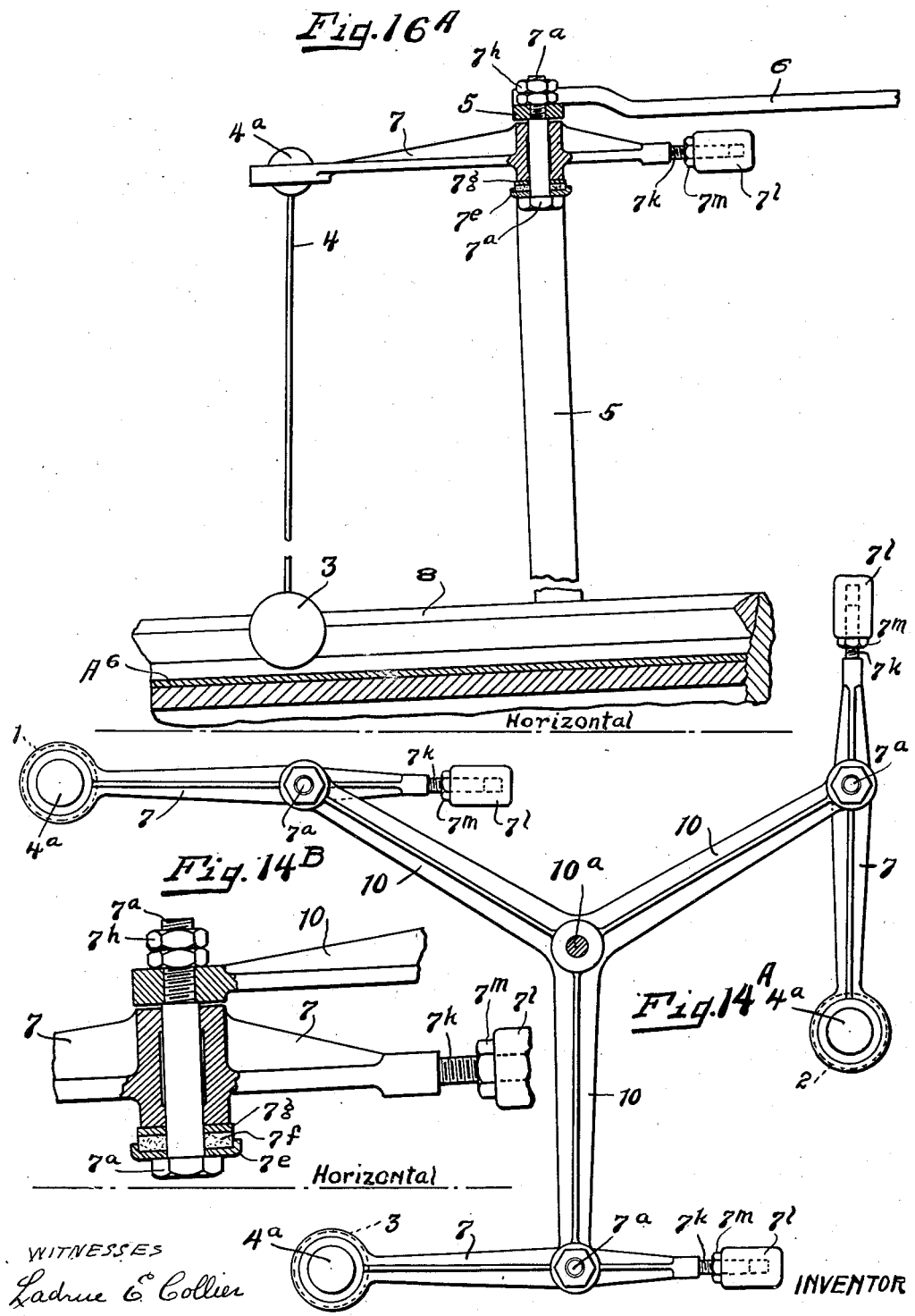

Patented May 7, 1935

2,000,123

UNITED STATES PATENT OFFICE 2,000,123

GAME AND GAME APPARATUS

George F. Cahill, New York, N. Y.

Application November 28, 1932, Serial No. 644,579

22 Claims. (Cl. 273—2)

My invention relates to a game and apparatus therefor of the general nature of billiards; and the object of my invention and the nature of the same will be better understood in the light of the following facts, namely—

In the well-known games of billiards and pocket billiards, very heavy and costly tables are required, since the slowly rolling balls would be deflected from their true course by any deviations of the surface of the table from the horizontal, and would settle into any depressions, although very slight, so revealing any imperfections in the table, and necessitating very well-built and expensive tables.

Also, in playing billiards, the balls are actuated by means of long sticks or cues, and the players walk all around the table and play from all sides, ends and corners of it. On this account, the floor space required for each table (usually, the table itself is five feet by ten feet, or fifty square feet) is several times as great as the table itself occupies. Even in public rooms when such tables are placed as near to each other as is deemed practicable, each table is thought to require a floor space of at least ten feet by fifteen feet, or one hundred and fifty square feet—three times the floor space actually covered by the table itself. But in actual practice, the space usually given to each table in such public billiard rooms, is considerably greater than the above. And where a single table is used in a room, as in a private residence, a five- by ten-foot table is supposed to need at least fifteen feet by twenty feet (three hundred square feet, or six times the floor space covered by the table itself). In consequence of the characteristics just described, standard billiard and pool tables are necessarily expensive in themselves and in the floor space that they require, and in fact, they require so much floor space that they cannot be placed in many houses or apartments at all.

Further, the games of billiards (not now speaking of English billiards or pocket billiards), as almost universally played in the United States, notwithstanding their age and high repute, either lack sufficient variety in the play, or are altogether too difficult to interest and hold the great majority of people who might otherwise play them. And experience has shown that very few women care to play any games which requires the use of a cue, no matter how attractive the game may be otherwise, and women appear to be at great physical disadvantage in comparison with men, when they do attempt to play such games.

Moreover, all such table games which are played by means of a cue, and from all around the table, require that the players stand, while playing, although many people who have stood all day at their work, do not care to stand in the evening for recreation.

The principal object of my invention is to produce a game or games and apparatus therefor, of the general nature of billiards, which can be played on less perfect and, therefore, less expensive tables than heretofore required; which can be played entirely from one end of the table and which, therefore, needs far less floor space than has heretofore been required; a game which beginners will not find so difficult as they do the present games of billiards, without, however, being too simple for experienced players; a game which will add variety and consequent interest to the simpler forms of billiard play; a game which will make the more complex and interesting plays less difficult of execution, so that a player of a given skill may enjoy the greater pleasure of making more complex shots; a game which can be played either by means of a cue or by means of a substitute for a cue; a game which can be played while standing up or sitting down; and a game which women can play without an apparent physical disadvantage, in comparison with men, in the impelling of the shooting or cue ball.

Another important object of my invention is to maintain, a substantially uniform distance above, but not in contact with, a tilted playing surface, a plurality of targets which are free to assume varying positions with relation to each other over said tilted playing surface aforesaid, so that the playing ball will act as nearly uniformly as possible on said targets, no matter where they may stand over said tilted playing surface.

Another object of my invention is to prevent gravity from causing such targets, although the plane in which they move is tilted with relation to the horizontal, to come to rest far more frequently in the lower part of the tilted plane in which they move than in other parts of such tilted plane.

Another object of my invention is to produce a game or games, and apparatus therefor, in which a player, instead of having the next play definitely prescribed for him, may choose one or another of a large variety of plays, said plays varying greatly in difficulty and complexity.

Another object of my invention is to make a game or games, and apparatus therefor, in or by means of which a player can win a larger score or credit for achieving a difficult and complex play, than for a simple play, with a close relation between the difficulty of the play and the amount of the increase in his score.

Another object of my invention is to reduce the time during which, in the playing of a game, a player must wait for a swinging pedant target ball to come to rest before he can aim his playing ball at it again.

Another object of my invention is to cause a cue ball, when a player is about to shoot it, to stand at a convenient shooting distance (say six to eight inches) out from the lower playing end of my table, although the ball lies upon a playing surface which slopes toward the players' end and would otherwise be in close contact with the players' end of the table.

Other objects of my invention will appear from the drawings and the description below.

In the accompanying drawings—

Fig. 1 is a view in perspective, showing one form of my apparatus in which the ball is delivered to the table, by the player, by means of a chute;

Fig. 1A is a perspective view of the rear part of one of my tables, generally similar to the table shown in Fig. 1, except that in Fig. 1A, the levers, which are independently shiftable and which support the target balls, instead of being mounted upon fixed centers, are mounted upon centers at the ends of the arms of a tripod, which tripod itself is mounted upon a fixed center and is capable of rotation thereon;

Fig. 2 is a plan view of the apparatus, seen in perspective in Fig. 1;

Fig. 3 is a side elevation of the apparatus shown in perspective in Fig. 1 and in plan in Fig. 2;

Fig. 4 is a plan view of the construction shown in Fig. 1A;

Fig. 4A is a plan view, similar to Fig. 4, but showing a modification of the means for connecting the chutes C, C', with my table;

Fig. 5 is a side elevation of the construction shown in perspective in Fig. 1A and in plan in Fig. 4;

Fig. 6 is a perspective view, in general similar to Fig. 1, save that it shows the players' end of my table adapted for playing with a cue (that is, a cue or a stick is used by the player to strike the playing balls) instead of using a chute to drop them, or throw them upon the table;

Fig. 7 is a side elevation of the apparatus shown in Fig. 6, for playing with the aid of a cue or a striking stick;

Figs. 8 to 16 are detail views illustrating mountings for my target balls. Of these—

Fig. 8 is a top plan view of one form of target-ball-carrying lever, 7, 7, or shiftable mounting for the target ball, and Fig. 9 is a side elevation of the same;

Fig. 8A is a detail view in plan corresponding to Fig. 8, and Fig. 9A is a detail view, partly in sectional elevation, corresponding to Fig. 9, but showing, in each case, a different means of adjusting the counter weight 7ⁿ, from that shown in Figs. 8 and 9 for adjusting the counterweight 7¹;

Figure 26:
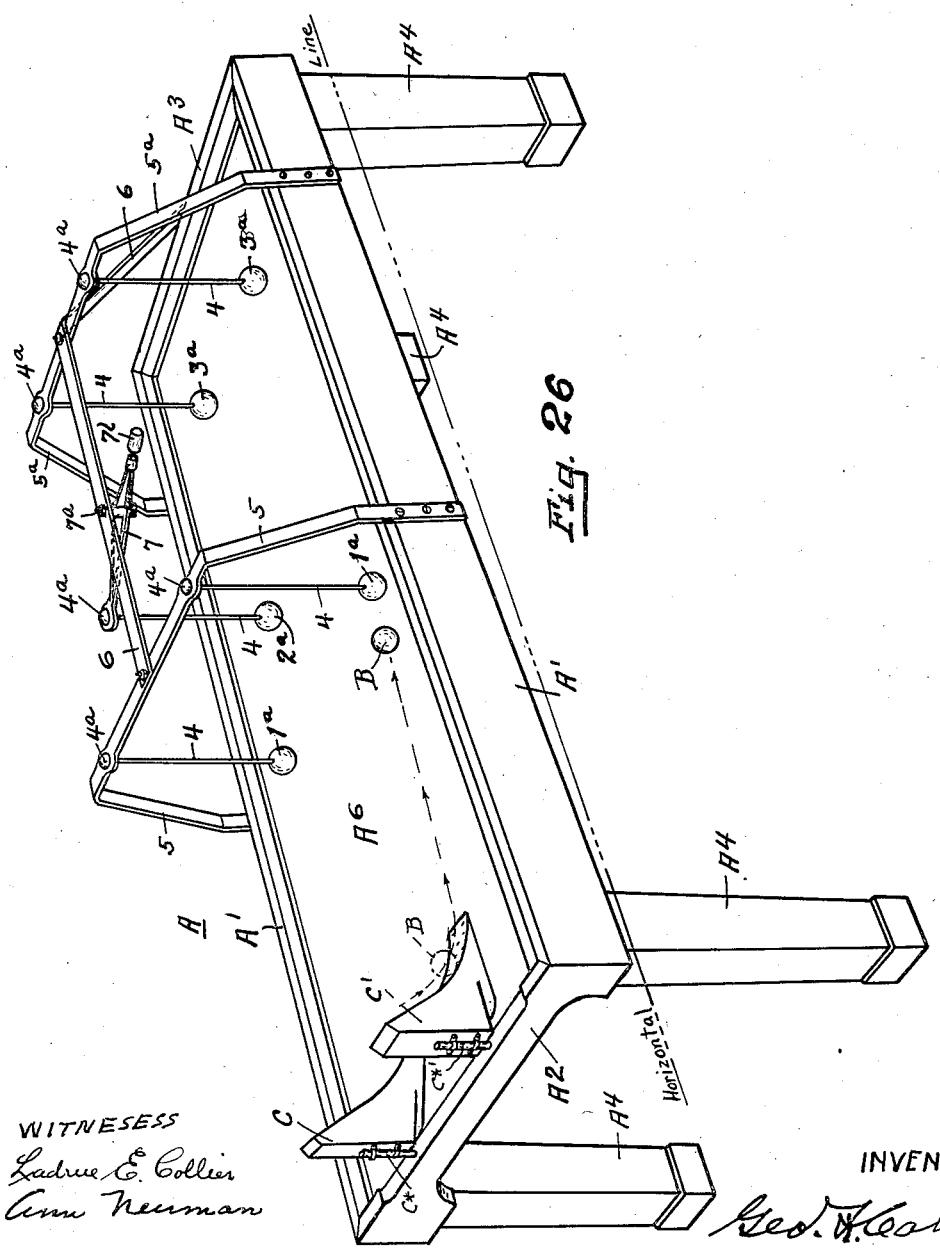

Fig. 10 is a sectional view, partly in elevation, showing, on a much larger scale than that of Fig. 9, means for mounting, in the pivoted arm 7, my friction balls or spheres 4ª, from which hang my target ball 1, 2 or 3; and in this Figure the pendant 4 for carrying the target ball, is broken away, to save space;

Fig. 10A is a plan view of the means for mounting my friction spheres 4ª, with the upper parts broken away, to illustrate the construction more clearly;

Fig. 11 is a side elevation, Fig. 12 is an inverted plan view, and Fig. 13 is an end elevation of one of my chutes;

Fig. 14 is a top plan view of one form of frame 10 (in this case a tripod but it may be of any suitable form) by which a shiftable mounting is given to a plurality of the target-ball-carrying levers, 7, 7, of Fig. 1A, so that the levers, 7, 7, shift together, as a group, and also each independently of the others;

Fig. 14A is a detail, a top plan view, showing on a larger scale than Fig. 14, the rotatably-mounted frame 10 with the ball-supporting arms 7, 7, pivoted to the arms of said frame.

Fig. 14B is a detail view, partly in section, partly in elevation, and largely broken away, showing one means of connecting the ball-supporting arms or levers (as 7, 7) with the rotatably-mounted frame 10.

Fig. 15 is a side elevation of the tripod shown in Fig. 14;

Fig. 16 is a detail view on a larger scale than the preceding figures, partly in section, partly in elevation, showing one convenient means for mounting the tripod 10, of Figs. 1A, 14 and 15, which carries the ball-carrying levers or pivoted arms 7, 7, on the iron framework 5, 6, above my table.

Fig. 16A is also a detail view, partly in section, partly in elevation, and with the table largely broken away, illustrating the facts that the playing surface of the table is inclined to the horizontal, and that the axis 10ª, which forms a support for the lever 10 which carries the target ball mounting, or the similar shaft 7ª, which serves as an axis for the frame 10, stands perpendicular to the playing surface A⁶ of the table; but is inclined to the vertical, correspondingly to the incline of the table surface to the horizontal.

In the forms of apparatus shown in Figs. 1 to 16, the shiftable mountings for my target balls are made by means of one or more pivoted arms, as 7, 7, or the pivoted frame 10, but with the apparatus shown in Figs. 17 to 22, the mountings for the target balls are made to move on a track or rail. Of these—

Fig. 17 is a longitudinal cross section of my table, showing a framework mounted above the same, and having a track 13, or preferably, a plurality of tracks 13, 13 (Figs. 18) which may be circular or otherwise shaped, on which tracks small trucks or frames with wheels move, the frames serving to mount the target balls and serving also to support the wheels which run on the track;

Fig. 18 is a top plan view of the apparatus that is shown in side elevation in Fig. 17, showing a plurality of the tracks 13, 13, one inside another, with trucks 11, 11, mounted on them respectively;

Fig. 19 is a detail view, partly in section, partly in elevation, showing one of the trucks or wheel-frames in side elevation, with the mounting for one of the target balls attached to it below;

Fig. 20 is a top plan view of the thing shown in side elevation in Fig. 19, but with the rail, 13, omitted;

Fig. 21 is a detail view similar to Fig. 19, but in a plane at right angles thereto;

Fig. 22 is a detail view, partly sectional and at a right angle to the preceding figure, on the line 22, 22, of Fig. 21, illustrating principally one construction for supporting the friction sphere or ball 4ª.

Fig. 23 is a view in perspective, illustrating the rear part of a table, whose front portion is seen in Figs. 1, 2, 3, 6 and 7, with a different arrangement, in detail, of the means for mounting the target balls, as described below, and this mounting is such that, without making the center friction balls 4ª, 4ª, on which the target balls (as 1, 2, 3) respectively, swing, susceptible of a movement of translation (as in the case with the mountings shown in Figs. 1 to 6) the mounting provided in Fig. 23 yet affords facility to the target ball, to take up and hold, until new forces come into play, continually changing positions, under the impacts of the playing balls.

Fig. 24 is a detail view, partly in cross-section, partly in elevation, and on a larger scale than Fig. 23, illustrating the same modified construction as said Fig. 23; and in this figure the solid lines show the target ball 2, stem 4 and balancing ball 4ᵇ in its central position, and the dotted lines show them in other positions.

Fig. 25 is a detail view, partly in section, partly in elevation, which is to be taken in connection with Figs. 23 and 24. It shows a friction-ball mounting for the shaft 4, to which the target ball is attached, which is shaped in such a manner that it prevents the target ball (1, 2 or 3) from coming to rest beyond a certain pre-determined distance from its lowest pendant position, so as to prevent the target balls, when displaced by the impact of a playing ball, from standing so high above the table that another target ball would pass under them, and so would fail to strike them.

Fig. 26 is a view in perspective, showing still a different embodiment of my invention, in which one or more target balls are suspended from mountings which do not change their positions over the playing surface, while one other is suspended from a mounting which continually changes its position over the playing surface, so bringing its target ball into ever changing relations to the other target balls.

Fig. 27, which is a plan view, and Fig. 28, which is a longitudinal section, illustrate another embodiment of my invention, by which targets at the pit end of a bowling alley, may be made to assume ever changing positions with relation to each other over the surface of said bowling alley, and so to obviate the necessity of continually setting up pins and to save the expense which such work now entails.

Fig. 29 is a perspective view of a bowling alley, from which certain parts have been broken away, which is somewhat tilted from the horizontal and in which the target balls are caused to move in a plane or planes substantially parallel with the tilted playing surface, but without having a tendency to move toward or settle into the lower part of their tilted planes.

*Reference characters*

The following list of reference characters may be of aid in reading the drawings, particularly when this is read without the aid of the other descriptive matter contained in the specification.

A (above Fig. 1) is my playing table, considered as a whole.

$A^1$, $A^1$, are the side beams of the table.

$A^2$ is the end beam at the players' end of the table.

$A^3$ is the end beam at the remote end of the table.

$A^4$, $A^4$, are the legs of the table.

$A^5$, $A^5$, are cross beams of the table, parallel to the end beams $A^2$, $A^3$, and serving to connect the side beams $A^1$, $A^1$.

$A^6$ is the table top of wood or other suitable material.

$A^7$, $A^7$, are slots in the end beam $A^2$ (see Fig. 4ᴬ), which serve to receive the pivot pins $C^*$ and $C^{1*}$ of the chutes C, $C^1$.

$A^8$ is a notched strip for positioning the cue ball.

B, B are the cue- or shooting balls.

C, $C^1$ are the chutes.

$C^*$, $C^{*1}$, are the pivot pins or rods which, preferably, are attached to the chutes, and serve to enter into holes or slots, formed for the purpose in the end beam $A^3$, at the players' end of the table.

$C^{2*}$ is a handle at one side of the chute, by which the player may more conveniently turn the chute and steady it while delivering his ball.

1, 2, 3 are target balls; three I have found to be a suitable number, but a greater or lesser number than three may be used.

4 is the pendant or rod by which the target ball (1, 2 or 3) is hung.

4ª is the mounting friction ball or sphere, by which the rod 4 and target ball (1, 2 or 3) are supported.

4ᵇ is a counterbalancing ball, attached to the upper end of the rod 4; seen in Figs. 23 and 24.

5 is a bar of iron or steel which is attached to the side beams $A^1$, $A^1$, of my table, and which serves to support the mountings for the target balls, or in Fig. 18, to support the tracks 13, 13, on which the trucks 11 run that carry the mountings for the target balls 1, 2, 3, aforesaid.

6 is an iron piece, one end of which is attached to the top of the bar 5, while the lower end is attached to the rear end beam $A^3$ of my table.

7, 7, are levers or pivoted arms, at one end of each of which is a mounting to support the ball 4ª, from which, by the rod 4, one of the target balls (1, 2 or 3) is hung. The lever or pivoted arm 7 is itself centered at 7ª. It is generally turned on the center, 7ª, into a new position by the impact of the cue-ball against its target ball 1, 2 or 3. Thus, the lever and its target ball are continually assuming different positions over the playing surface, as a result of the play itself.

7ª is the pivot for the pivoted arms 7.

7ᵇ (Figs. 10, 22 and 25) is a washer or circle of felt or other suitable material, having a circular hole in the center, of less diameter than the ball 4ª, and which serves to support such ball.

7ᶜ is a washer or circular disk of iron or other suitable material which, with the screws 7ᵈ, 7ᵈ, serves to clamp the felt washer 7ᵇ, in position, at the end of the pivoted arm 7.

7ᵈ, 7ᵈ, are screws.

7ᵉ is a formed metal washer, seen in Fig. 16, which rests upon the head of the shoulder screw 7ª, and serves in turn to support and partly surround a felt washer, preferably oiled, 7ᶠ.

7ᵍ is another metal washer which lies between the felt washer 7ᶠ and the turning lever 7 or tripod 10.

7ʰ is a lock-nut, by which the center pin 7ª (provided with a bolt head 7ⁱ and screw threaded at the upper end to engage a female thread in the framework 5) is locked in position in the same.

$7^k$ (Figs. 8 and 9) is a screw-threaded rod, which is set fast in one end of the pivoted arm 7, or formed integral therewith.

$7^l$ is a counterbalancing weight which is drilled and tapped to fit the screw-threaded rod $7^k$ and is adjustable thereon.

$7^m$ is a lock-nut for locking the part $7^l$ in any position desired on the rod $7^k$.

$7^n$ (Figs. $8^A$ and $9^A$) is a counterbalancing weight mounted adjustably at one end of the pivoted arm or lever 7, as a substitute for the part $7^l$.

$7^p$ is a slot in the end of the arm 7 (Fig. $9^A$) in which the screw $7^q$ slides, that serves to fasten the weight $7^n$ to the arm 7.

$7^q$ is a screw; seen in Fig. $9^A$.

$7^r$ is a washer, through which the screw $7^q$ passes.

8, 8, are cushions of rubber or other suitable elastic material, which are, preferably, provided around the inner walls of the table.

9, 9, are indications formed on the table, such as pins or screws, to aid the player in aiming the playing ball at the target balls 1, 2, 3.

10 (Figs. $1^A$, 4, 5, 14, et cetera) is a frame, on the arms of which are centered the ball-carrying levers 7, 7.

*Description of apparatus*

My improved table may be made in any suitable manner, but I have found the construction shown in Fig. 1 very suitable and inexpensive. Inside the main frame, and on top of the cross pieces or stringers $A^5$, $A^5$, I lay down a floor or wooden bed, $A^{51}$, (see Fig. $1^A$) on top of which slate and cloth may be used, as they are used on billiard and pool tables, or any other suitable substance may be used as a playing surface; or the top of the bed itself may be used as a playing surface. At present, on top of the wooden bed or flooring, I am using an inexpensive sheet of a hard smooth composition called Presdwood, manufactured by the Masonite Corporation, of Chicago, Illinois. So far, this has behaved well, as far as hygroscopic changes are concerned, and the ball, as it moves forward on the table, takes less rotation from it than it would from cloth. Also, the Presdwood wears, perhaps, better than cloth, especially at the points where the shooting balls first contact with the table after being impelled down the chutes C or $C^1$. Further, the smooth, dense surface of the Presdwood makes it very easy to dust and keep clean.

To at least two sides and the back of my table, I attach cloth-covered rubber cushions, 8, 8, of the general character of the cushions used upon billiard tables and sometimes to the players' end, $A^2$, especially when my new game is being played with cues.

Over the higher or rear part of the table, I erect a structure or framework, preferably such as is indicated by the parts 5 and 6 in Fig. 1 and other figures. And to that framework I attach, preferably, three levers, 7, 7, set on substantially vertical centers, $7^A$, $7^A$. A greater or lesser number of these levers may be provided, as desired. From one end of each of said levers is suspended a target ball, 1, 2 or 3, just above the surface of the table. And, preferably, when the playing surface is tilted somewhat upward at the back, I weight the rear or short end of said levers 7, 7, to just about counterbalance the weight of the front end of the lever and its burden.

The cue-ball or shooting ball may then, by a very natural movement of the hand and forearm, be projected down the inclined chutes C, $C^1$, as indicated in Figs. 3 and 1, or it may be impelled by means of the customary cue, as seen in Figs. 6 and 7. When the chutes are used, the players may stand or sit, as they please.

In order to save the great amount of space which is needed if the players are to play from any and every position around the table; to make it possible for the players to play wholly from one end of the table; to remove the necessity of their ever walking around the table at all; and to make it possible for a much cheaper, less solid and less perfect table to serve for a highly scientific game, I tilt the playing surface of my table, and preferably the whole table, upward from the players' end of the table, that is, from the end at which the players stand, and at which the chutes C, $C^1$, are mounted, as shown in Figs. 1, 2, 3, et cetera, so that the players' balls will automatically return to the players' end of the table, whether their natural course would return them there or not. The amount of tilt given to the table may be varied, of course. Experience has shown that each different angle affects the play in a different manner. In practice, I have found a difference in height of about four inches between the back end of an eight-foot table and its front end, very satisfactory.

The fact that my table is inclined somewhat upward from the players' end, so that the balls will return thereto by gravity, is indicated in Fig. 1 and perhaps in some other views, by a horizontal line drawn just under the table.

C and $C^1$ illustrate one construction of my chutes, for transforming the downward movement of the player's ball into an approximately horizontal movement. I have made these chutes of hard wood, and of heights varying from seven inches to fifteen inches above the table, and with the straight, upright part of the chute, with which the ball first comes into contact, cut at an angle of sixty degrees to the table, and at other angles; but the chutes may be of any suitable material and of any suitable size and contour. I preferably pivot the chutes at their back or players' end, much as indicated in the drawings, with the ends of the pivot pins or rods C and $C^{*1}$, setting into holes in the end piece $A^2$. Such a construction permits the chute to be directed at any target ball at which the player may wish to aim, or at practically any part of the cushion. Preferably, I put a handle, $C^{2*}$, on the side of the chute, by which the player may the more conveniently turn the chute and steady it, while delivering his ball.

In some of the drawings the chutes are shown as pivoted in fixed positions. However, I sometimes make my chutes movable crosswise of the table, to permit a player to select for himself the position from which he desires to deliver his ball. One construction which I have contrived for this purpose is to cut slots, $A^7$, $A^7$, Fig. $4^A$) in the top of the end piece $A^2$, into which the pivots $C^*$ and $C^{*1}$ of the chutes, set. And I have constructed this so that a chute's movement sidewise is limited to one-half the width of the table; but by lengthening the slot $A^7$, the chute may be moved practically all the way across the end of the table. After considerable experience, I am inclined to believe that fixed positions for the chutes, as indicated, for example, in Figs. 1, 2 and 4, are, on the whole, better than to provide sidewise movement for the chutes. But another person might, perhaps, come to a different conclusion on this point.

As to the target balls, and the mountings for the same, in one embodiment of my invention, which I have found very satisfactory, I attach three levers, 7, 7, by means of shoulder screws or bolts 7a, to the underside of the super-structure or framework 5, 6, in such manner that each of said levers 7 may turn freely all the way around its center and carry its target ball with it. One end of each such lever I preferably form into a ring or socket, to form a mounting for the friction ball or sphere 4a.

Early in my work, I found that when a target ball was suspended by a cord, a chain, a hook-and-eye joint, an ordinary pivot, et cetera, it vibrated or swung back and forth for so long a time as to greatly interfere with the pleasure of the play. To permit the target ball to move freely when struck, but to cause it to slow down its vibration soon thereafter, I devised a friction brake, in one form of which the target ball is suspended by means of a wire or stiff rod from a friction device which acts as a brake upon the movement of said ball. At first the friction ball bore directly on the metal of the lever 7. But I now prefer to use a construction such as that shown in the large detail views, Figs. 10 and 10A, in which the seat or bearing in the lever 7 is enlarged somewhat, so that the ball does not come into contact with it at all, but with a washer 7b of felt, leather, rubber or other suitable material, which, preferably, is held against the lower side of the lever 7, by a metal ring, 7c, attached firmly to the enlarged end of the lever 7, by means of the screws 7d, 7d. The friction ball 4a then bears on the felt only, which does not discolor or mar the ball as the metal did, and which makes a very satisfactory bearing surface.

Below the friction sphere 4a, the target ball (1, 2 or 3) is suspended by means, preferably of a rod 4, which may be of steel or of any other material that is suitable for the purpose. Said target ball (1, 2 or 3) is, preferably, suspended from a point just above the surface of the table, as near the table as is practicable, without coming into contact therewith. I have used more than three target balls and fewer than three; but I consider three to be a satisfactory number.

When the playing ball B strikes any target ball, it tends to impart movement to said target ball; and this movement tends to displace the mounting ball 4a and lever 7 from the positions which they had occupied before the target ball was struck. When the target ball comes to rest, therefore, it is likely to occupy a different position with relation to the other target balls, or with relation to a fixed point upon the table, from that which is occupied just before it was struck. Such altered positions of the targets with relation to each other become, of course, their positions for the next shot.

If the center, 7a, on which the lever 7 moves, be set vertically, as I, at first set it, the target ball moves in a horizontal plane, although the playing surface beneath it is tilted, and the ball stands at different distances above the table at different times, which is undesirable. If the center, 7a, of the lever 7, be set at right angles to the playing surface, and the lever 7 has no extension backward from its center, as I next made it, the target ball moves in a plane parallel to the tilted playing surface, but has a strong tendency to assume a position at the lower part of the tilted circle in which it moves, and to very greatly reduce the number of positions which the target balls might otherwise assume over the playing surface. To overcome these difficulties, I have set the center 7a, at right angles or nearly at right angles to the inclined playing surface of the table, making said axis or center 7a perpendicular rather to the surface of the table than to a horizontal line; this will be understood from Figs. 3, 5, 7, 16, and 16A. An exact right angle, of course, is not necessary, but the closest approach to a right angle that is easily to be attained, is preferably used. Deviation from exact perpendicularity as between the shaft 7a or 10a and the playing surface of the table, is not injurious, if small. Also, I have extended the lever 7 backward from its center 7a, and have attached thereto a weight (see 7¹ or 7ⁿ in Figs. 8 to 9A especially), which just about counterbalances the long end of the lever 7 and its burden. This construction cured both of the difficulties above pointed out and permits the lever 7 and its target ball to assume positions in any part of its circle, although moving in a plane parallel to the tilted playing surface.

By the construction just described, the three target balls are continually assuming ever varying positions with relation to each other or to a fixed point upon the table. The different positions which any target ball can assume, however, are substantially limited to the circle described by the rotation of its lever 7. To permit the target balls, 1, 2, 3, to assume a greater number of different positions with relation to a fixed point upon the table, and especially for very skillful players, I have contrived the construction shown in Figs. 1A, 4 and 5, in which the levers 7, 7, are carried at the ends of the arms of the frame 10 (see Figs. 4 and 14) and the frame 10 itself is pivoted to the framework 5, 6, as seen especially in Figs. 4 and 16.

With the forms of apparatus shown in Figs. 1 to 5, chutes C, C¹, are shown as a means for directing the player's ball against any of the target balls or against the cushions 8, 8, therefrom to be deflected to a target ball. Chutes are especially convenient when playing my game apparatus with the players seated, and they are convenient, also, for players who do not like to use a cue. But many persons prefer to play my games with a cue, and my apparatus is adapted to be used in this way also. This will be understood particularly from Figs. 6 and 7. When my apparatus is used in this way, the chutes may be removed and, preferably, are removed, and a sheet of rubber, leather, or other suitable material, A⁸, whose front edge, preferably, is fluted or notched, is placed at the players' end of the table, to hold the ball, against gravitation, a convenient shooting distance out from the players' end of the table. Into one or another of the notches in the sheet or plate A⁸, the playing ball B is set by the player, before shooting it.

The customary diamonds or other suitable indications may be formed on the side-bar of the table, or on some part connected with it to aid the player in directing his balls. But, for this purpose, I have also used screws, 9, 9, of different colors, along the top surface of the Presdwood, under the lee, so to speak, of the cushion 8, where they are easily visible to the player, but are so far in, under the overhanging cushion 8, (see Fig. 1A) that the ball B does not strike them. These screws serve the double purpose of holding the Presdwood surface of the table in place and of indicating positions to the players.

In the forms of apparatus shown in Figs. 1 to 16, the mountings for the target balls are themselves part of, or they are carried on, something which is pivoted and moves in a circle, or at least in a circular arc. This mode of working is convenient and satisfactory, but other modes of working are possible, a few of which I shall now describe—

*First*.—The mounting for the target ball may be a small truck or other device, which moves on or in a track or frame or guideway. One form of device for this purpose is illustrated in Figs. 17, 18, 19, 20, 21 and 22, in which 11 is a frame, which forms the mounting for the friction ball 4a, or to which the mounting for the ball 4a is attached; that is, the felt ring 7b, the disk or washer 7c, and the screws 7d, are attached to the frame 11, just as they were attached to the end of the lever or pivoted arm 7, and this same frame 11, supports the pivots or axles 12a, 12a, of the small wheels 12, 12, which run on a track 13, whether said track be circular or roughly square or rectangular, as in Fig. 18, or be of any other suitable shape. When the target ball is struck by the playing ball, at least when it is struck with sufficient force and at a proper angle, the truck 11 moves on the track 13, so that when the target ball comes to rest, it is in a different position from that which is occupied before it was struck, and the several trucks, and the several target balls they carry, take up continually changing positions as a result of the impacts of the playing balls B, B, on the target balls, 1, 2 and 3.

*Second*.—Another form of mounting is shown in Figs. 23, 24 and 25. In this the same general result of constantly shifting positions and constantly changing relations of the target balls 1, 2, 3, to each other, is obtained by a structure of a simpler character, in which the friction ball 4a has no movement of translation, but only an angular movement. In this case, each of the friction balls is mounted in the framework 5 or 6, preferably with the same felt washer 7b and clamping disc 7c before described, but the rod 4, by which the target ball is hung, is preferably extended upwards a considerable distance above the mounting-ball 4a and has also, preferably, another ball or weight 4b of any suitable sort, at its top. This ball 4b is preferably made to be of sufficient mass so that it tends in part and substantially to counteract or neutralize the tendency of the ball 1 to return to its normal position and it also tends to increase the friction of the mounting ball 4a against the supporting surface 7b. The consequence is that the target ball, when struck and moved by the playing ball B, does not return to a central vertical position, but assumes a position more or less different from its central vertical position, depending upon the force of the impact and the direction in which it was struck by the target ball B. Thus, each of the target balls, 1, 2, 3, assumes a different position each time it is struck, and the relative positions of the three change continually.

To prevent the target balls, in the apparatus of Figs. 23, 24 and 25, from departing too far from their normal position; that is, from rising so high above the table that the playing ball would not contact with them properly, the surface of the mounting ball 4a, instead of being made wholly spherical, may be made of a smaller diameter below and of a larger diameter above, somewhat as shown in Fig. 25, so that the shelf or ledge resulting from the larger diameter striking against its support, will resist excessive movement of the target ball, and cause it to settle in a position not higher than that indicated in Fig. 25. Or a complete sphere, 4a, may be used, and an elongated target ball, such as 3b in Fig. 28 may be used, in place of the spherical target ball 3, of Fig. 25.

In Fig. 26 a somewhat different embodiment of my invention is shown. There four target balls, 1a, 1a, 3a and 3a depend from four friction spheres or mounting balls, 4a, 4a, and these mounting balls, 4a, 4a, are themselves set in supports which do not move laterally, while another target ball, 2a, is carried in a lever 7 in the manner previously described. As a consequence, the target ball, 2a, is continually changing its position with relation to the four comparatively-fixed target balls, 1a, 1a, 3a and 3a, and, preferably, a carom is made by hitting the movable target ball 2a, in conjunction with one or other of the relatively fixed balls.

My drawings and specification explain sufficiently, I believe, my new game apparatus, but possibly some explanation is needed of the new games or the improvements upon old games, which may be played upon my new game apparatus. While, of course, it is not possible to mention all of them, I would like to call attention to a few of them—

*First*.—One form of billiard game has, in the past, consisted almost wholly of making caroms or causing the cue ball to hit the other two balls at each shot. On a standard billiard table, the two balls can be gotten into a corner and then hit over and over again until it becomes monotonous, and without the cue ball resting more than a few inches from one or the other balls after each shot. But no equivalent of this is possible on my new table, since the balls can never be gotten into a corner, and since the cue ball itself returns after each shot to the playing end of the table, and there is a new grouping of the balls after practically every shot. This greatly increases the variety and consequent interest in a billiard game which consists wholly or almost wholly of making caroms;

*Second*.—On account of the simplicity and consequent monotony of that particular billiard game which consists in making simple caroms, billard players pass over to a game in which three cushions must be hit, as well as the two balls. This game, in turn, is altogether too difficult for the great majority of players, and ends too large a proportion of their attempts in failure. But games which include the hitting of two balls and one or more cushions at each shot, which I have invented for use in connection with my new apparatus, make the complex and interesting plays less difficult of execution, from the facts (*a*) that the balls to be hit are not allowed to spread all over the surface of the table, but are definitely retained over a smaller area: (*b*) that, preferably, three target balls instead of two are provided, and the player is given an opportunity to choose any two of the three or either one of two in conjunction with a predetermined third; and (*c*) that, although a player misses the second ball of the carom he is trying to make, his ball may hit the alternate target ball and so give him a carom and complete his play where he would have failed to complete the play if only two target balls were used;

*Third*.—Long experience has shown that women do not like to impel a ball by means of a cue, and will not generally play billiards even in their homes, although of all games implying any physical action, billiards might seem most suitable to women. But a woman can throw a ball down one of my chutes, C, C¹, apparently just as well and as naturally as a man can do it. Thus, by my new game apparatus, women are not put at any physical disadvantage in comparison with men, as they are in the impelling of a ball by means of a cue. Experience so far has shown that women thoroughly enjoy games of billiards when played upon my improved game apparatus;

Fourth.—When a player's turn to play comes, in practically all billiard (not pool) games with which I am acquainted, his play is definitely prescribed for him, that he is to hit both the cue ball and his opponent's ball. But generally, in my improved games of billiards, he has a chance either to hit any two of the three balls, or one pre-determined ball and either of the other two, or he may choose to hit all three balls. This opportunity to choose which one of a number of different plays he will attempt to make, adds, I believe, greatly to the variety, interest and enjoyment of the game; and Fifth.—In most of the established games of billiards (not pool)—certainly in those that command the greatest following—each successful play can add but one point to the player's score. But in the old games of billiards, when played upon my new table, a player may make a score of one by hitting two balls, and a score of two by hitting three balls, thus rewarding the execution of more difficult and complex plays. And in several new games which are played upon my improved table, a score of anywhere from one to four or five may be made at a single shot, according to the difficulty and complexity of the shot. Thus, in a game which we call Beginner's Luck, one is scored for each ball hit on each shot, plus one for each cushion hit on that shot, before the final ball included in it has been hit. And in other ways in other games which we have played upon my new table, the interest is heightened by allowing the player a wide variety of choice in the shot he will attempt to make, and rewarding him by an increase in his score about proportionate to the difficulty and complexity of the shot he makes.

In Figs. 27, 28 and 29, other embodiments of my invention are shown. There targets, 1ᵇ, 2ᵇ and 3ᵇ, somewhat similar to ten pins, are suspended over the pit end of an otherwise standard bowling alley, from shiftable mountings carried by the levers 7ˢ, 7ˢ and 7ˢ, centered upon the framework 5ᵃ, 6ᵃ and 8ᵃ, which, in turn, is erected upon, or bolted to, the kickbacks, a⁵, a⁵, and the rear bar, a³, of the bowling alley. The targets, 1ᵇ, 2ᵇ and 3ᵇ, continually change their positions with relation to each other under the impact of the bowling ball, B¹, which may be thrown down the alley in the usual manner, aimed at the balls or pins, 1ᵇ, 2ᵇ, et cetera. The whole arrangement is such that the impact of the ball B¹ against the target 1ᵇ, in particular, may cause said target to hit either of the other targets, and such that, generally, the impact of the bowling ball, B¹, against any target may cause it to hit some other target or targets.

Besides supplying new and ever changing targets for players to bowl at, the construction of Figs. 27 and 28 dispenses with the necessity of continually setting the pins. But it is still necessary to have a pin-boy or a ball-returning mechanism of some kind to return the balls to the players' end of the alley. To overcome this expense, I preferably tilt up the rear part of the alley sufficiently so that the player's ball will return by gravity from the pit to the players' end of the alley. Any suitable constructions for that purpose, in which the bottom of the pit tilts toward one side, so that the ball rolls down toward that side, and into a trough or runway which guides it to the front end of the alley, may be used. But in the construction of Fig. 29, the bottom or floor of the pit, a⁶, tilts downward to the far side of the alley and delivers any ball which falls into it into the trough or runway a⁹, which in turn tilts downward toward the players' end of the alley, so that the ball B¹ returns by gravity to the players' end of the alley, thus wholly dispensing with the services of a pin-boy.

When the playing surface of the pin end of such an alley is tilted upwards toward the back, counterweighted levers 7, 7, are preferably used.

What I claim as my invention and desire to secure by Letters Patent is—

1. A target mechanism for use in a game apparatus, which includes (a) a target; (b) a supporting means to support said target; (c) means for suspending said target from the target-supporting means aforesaid; and (d) means between said target and said supporting means, designed and adapted to permit said target to swing when struck but to damp its oscillations and to bring it to rest quickly thereafter.

2. A target mechanism for use in a game apparatus, which includes (a) a target; (b) a supporting means to support said target; (c) means for suspending said target from the target-supporting means aforesaid; and (d) frictional means between said target and said supporting means, designed and adapted to permit said target to swing when struck but to damp its oscillations and to bring it to rest quickly thereafter.

3. A target mechanism for use in a game apparatus, which includes (a) a plurality of targets; (b) a supporting means to support said targets; (c) separate means for suspending each of said targets from the target-supporting means aforesaid; and (d) means between each of said targets and said supporting means, designed and adapted to permit said target to swing when struck but to damp its oscillations and to bring it to rest quickly thereafter.

4. A target mechanism for use in a game apparatus, which includes (a) a plurality of targets; (b) a separate supporting means to support each of said targets; (c) a separate means for suspending each of said targets from its target-supporting means aforesaid; and (d) means between each of said targets and its supporting means, designed and adapted to permit said target to swing when struck but to damp its oscillations and to bring it to rest quickly thereafter.

5. A target mechanism for use in a game apparatus, which includes (a) a plurality of targets; (b) a separate supporting means to support each of said targets; (c) a separate means for suspending each of said targets from its target-supporting means aforesaid; and (d) frictional means between each of said targets and its supporting means, designed and adapted to permit said target to swing when struck but to damp its oscillations and to bring it to rest quickly thereafter.

6. A target mechanism for use in a game apparatus, which includes (a) a plurality of targets; (b) a separate supporting means to support each of said targets, each supporting means being so constructed and adapted as to change its position in the approximately horizontal plane in which it moves, when the target it supports is struck; (c) a separate means for suspending each of said targets from its target-supporting means aforesaid; and (d) means between each of said targets and its supporting means, designed and adapted to permit said target to swing when struck but to damp its oscillations and to bring it to rest quickly thereafter.

7. A target mechanism for use in a game apparatus, which includes (a) a plurality of targets; (b) a separate supporting means to support each of said targets, each supporting means being so constructed and adapted as to change its position in the approximately horizontal plane in which it moves, when the target it supports is struck; (c) a separate means for suspending each of said targets from its target-supporting means aforesaid; and (d) frictional means between each of said targets and its supporting means, designed and adapted to permit said target to swing when struck but to damp its oscillations and to bring it to rest quickly thereafter.

8. A target mechanism for use in a game apparatus, which includes (a) a plurality of targets; (b) a separate supporting means to support each of said targets, each supporting means being so constructed and adapted as to change its position in the approximately horizontal plane in which it moves, when the target it supports is struck; (c) a separate means for suspending each of said targets from its target-supporting means aforesaid; (d) means between each of said targets and its supporting means, designed and adapted to permit said target to swing when struck but to damp its oscillations and to bring it to rest quickly thereafter; and (e) means for balancing each separate supporting means and its burden of suspending means and target, so that its target will have no materially greater tendency to come to rest in the lower part of its approximately horizontal plane of movement than in the upper part of its said plane of movement, when its said plane of movement deviates somewhat from the horizontal.

9. A target mechanism for use in a game apparatus, which includes (a) a plurality of targets; (b) a separate supporting means to support each of said targets, each supporting means being so constructed and adapted as to change its position in the approximately horizontal plane in which it moves, when the target it supports is struck; (c) a separate means for suspending each of said targets from its target-supporting means aforesaid; (d) frictional means between each of said targets and its supporting means, designed and adapted to permit said target to swing when struck but to damp its oscillations and to bring it to rest quickly thereafter; and (e) means for balancing each separate supporting means and its burden of suspending means and target, so that its target will have no materially greater tendency to come to rest in the lower part of its approximately horizontal plane of movement than in the upper part of its said plane of movement, when its said plane of movement deviates somewhat from the horizontal.

10. A target mechanism for use in a game apparatus, which includes (a) a plurality of targets; (b) a separate supporting means to support each of said targets, each supporting means being so constructed and adapted as to change its position in the approximately horizontal plane in which it moves, when the target it supports is struck; (c) a separate means for suspending each of said targets from its target-supporting means aforesaid; (d) means between each of said targets and its supporting means, designed and adapted to permit said target to swing when struck; and (e) means for balancing each separate supporting means and its burden of suspending means and target, so that its target will have no materially greater tendency to come to rest in the lower part of its approximately horizontal plane of movement than in the upper part of its said plane of movement, when its said plane of movement deviates somewhat from the horizontal.

11. A game apparatus, which includes (a) a playing surface on which players may impel players' balls; (b) a plurality of targets to be struck by said players' balls; (c) a primary supporting means for each of said targets, so constructed and connected with said playing surface as to move in a plane materially above, but substantially parallel to, said playing surface; (d) a secondary supporting means for suspending, pendulum-like, each of said targets from its primary supporting means aforesaid; and (e) frictional means for damping the pendulum-like oscillations of said target, after it has been struck, and for bringing it to rest quickly thereafter.

12. A game apparatus, which includes (a) a playing surface on which players may impel players' balls; (b) a plurality of targets to be struck by said players' balls; (c) a primary supporting means for each of said targets, so constructed and connected with said playing surface as to move in a plane materially above, but substantially parallel to, said playing surface; (d) a secondary supporting means for suspending, pendulum-like, each of said targets from its primary supporting means aforesaid; (e) frictional means for damping the pendulum-like oscillations of said target, after it has been struck, and for bringing it to rest quickly thereafter; and (f) means for balancing each separate primary supporting means and its burden of secondary supporting means and target, so that its target will have no materially greater tendency to come to rest in the lower part of its plane of movement than in the upper part of its plane of movement, when its plane of movement is parallel to a tilted rolling surface beneath it.

13. A game apparatus, which includes (a) a playing surface on which players may impel players' balls; (b) a plurality of targets to be struck by said players' balls; (c) a primary supporting means for each of said targets, so constructed and connected with said playing surface as to move in a plane materially above, but substantially parallel to, said playing surface; (d) a secondary supporting means for suspending, pendulum-like, each of said targets from its primary supporting means aforesaid; and (e) means for balancing each separate primary supporting means and its burden of secondary supporting means and target, so that its target will have no materially greater tendency to come to rest in the lower part of its plane of movement than in the upper part of its plane of movement, when its plane of movement is parallel to a tilted rolling surface beneath it.

14. A game apparatus, which includes (a) a playing surface on which players may impel players' balls; (b) a plurality of targets to be struck by said players' balls; (c) a primary supporting means for each of said targets, so constructed, connected with said playing surface, and operating as to cause the targets suspended therefrom to move in a plane just above, and substantially parallel to, said playing surface; (d) a secondary supporting means for suspending, pendulum-like, each of said targets from its primary supporting means aforesaid; and (e) frictional means for damping the pendulum-like oscillations of said target, after it has been struck, and for bringing it to rest quickly thereafter.

15. A game apparatus, which includes (a) a playing surface on which players may impel players' balls; (b) a plurality of targets to be struck by said players' balls; (c) an arm for supporting each of said targets, so pivoted and connected with said playing surface as to move in a plane materially above, but substantially parallel to, said playing surface; (d) a secondary supporting means for suspending, pendulum-like, each of said targets from its arm aforesaid; and (e) frictional means for damping the pendulum-like oscillations of said target, after it has been struck and for bringing it to rest quickly thereafter.

16. A game apparatus, which includes (a) a playing surface on which players may impel players' balls; (b) a plurality of targets to be struck by said players' balls; (c) a lever for supporting each of said targets, so pivoted and connected with said playing surface as to move in a plane materially above, but substantially parallel to, said playing surface; (d) a secondary supporting means for suspending, pendulum-like, each of said targets from its lever aforesaid; (e) frictional means for damping the pendulum-like oscillations of said target, after it has been struck, and for bringing it to rest quickly thereafter; and (f) means for balancing each separate supporting lever aforesaid and its burden of secondary supporting means and target, so that its target will have no materially greater tendency to come to rest in the lower part of its plane of movement than in the upper part of its plane of movement, when its plane of movement is parallel to a tilted playing surface beneath it.

17. A game apparatus, which includes (a) a playing surface on which players may impel players' balls; (b) a plurality of targets to be struck by said players' balls; (c) a lever for supporting each of said targets, so pivoted and connected with said playing surface as to move in a plane materially above, but substantially parallel to, said playing surface; (d) a secondary supporting means for suspending, pendulum-like, each of said targets from its lever aforesaid; and (e) means for balancing each separate supporting lever aforesaid and its burden of secondary supporting means and target, so that its target will have no materially greater tendency to come to rest in the lower part of its plane of movement than in the upper part of its plane of movement, when its plane of movement is parallel to a tilted playing surface beneath it.

18. A game apparatus, which includes (a) a playing surface on which players may impel players' balls; (b) a plurality of targets to be struck by said players' balls; (c) a primary supporting means for said targets, so constructed and connected with said playing surface as to move in a plane materially above, but substantially parallel to, said playing surface; (d) a secondary supporting means for each of said targets, so constructed and connected with said primary supporting means as to move in a plane materially above, but substantially parallel to, the playing surface aforesaid; (e) a tertiary supporting means for suspending, pendulum-like, each of said targets from its secondary supporting means aforesaid; and (f) frictional means for damping the pendulum-like oscillations of each of said targets after it has been struck, and for bringing it to rest quickly thereafter.

19. A game apparatus, which includes (a) a playing surface on which players may impel players' balls; (b) a plurality of targets to be struck by said players' balls; (c) a primary supporting means for said targets, so constructed and connected with said playing surface as to move in a plane materially above, but substantially parallel to, said playing surface; (d) a secondary supporting means for each of said targets, so constructed and connected with said primary supporting means as to move in a plane materially above, but substantially parallel to, the playing surface aforesaid; (e) a tertiary supporting means for suspending, pendulum-like, each of said targets from its secondary supporting means aforesaid; (f) frictional means for damping the pendulum-like oscillations of each of said targets after it has been struck, and for bringing it to rest quickly thereafter; and (g) means for balancing each separate secondary supporting means and its burden of tertiary supporting means and target, so that its target will have no materially greater tendency to come to rest in the lower part of its plane of movement than in the upper part of its plane of movement, when its plane of movement is parallel to a tilted playing surface beneath it.

20. A game apparatus, which includes (a) a playing surface on which players may impel players' balls; (b) a plurality of targets to be struck by said players' balls; (c) primary supporting means for said targets, so constructed and connected with said playing surface as to stand in a plane materially above, but substantially parallel to, said playing surface; (d) a secondary supporting means for suspending, pendulum-like, each of said targets from the primary supporting means aforesaid; and (e) frictional means for damping the pendulum-like oscillations of said target, after it has been struck, and for bringing it to rest quickly thereafter.

21. A game apparatus, which includes (a) a playing surface on which players may impel players' balls; (a) a superstructure above said playing surface, connected with said game apparatus, for supporting targets; (c) target-carrying means, one for each of said targets, supported by said superstructure and so constructed and operating that each changes its position in a plane approximately the same as the plane of the playing surface aforesaid underneath it, when the target it supports is struck by a player's ball, whereby a target or the targets struck come to rest in a new position or positions with relation to each other and to other targets, which new positions become the positions of the targets for the succeeding play; and (e) a plurality of targets suspended from said target-carrying means aforesaid, just above said playing surface, in positions to be hit by said players' balls.

22. A game apparatus, which includes (a) a playing surface on which players may impel players' balls; (b) resilient cushions for deflecting said balls; (c) a superstructure above said playing surface, connected with said game apparatus, for supporting targets; (d) target-carrying means, one for each of said targets, supported by said superstructure and so constructed and operating that each changes its position in a plane approximately the same as the plane of the playing surface aforesaid underneath it, when the target it supports is struck by a player's ball, whereby a target or the targets struck come to rest in a new position or positions with relation to each other and to other targets, which new positions become the positions of the targets for the succeeding play; and (e) a plurality of targets suspended from said target-carrying means aforesaid just above said playing surface, in positions to be hit by said players' balls.

GEO. F. CAHILL.